(12) United States Patent
Suzuki et al.

(10) Patent No.: US 8,641,252 B2
(45) Date of Patent: Feb. 4, 2014

(54) PLANAR LIGHT-EMITTING DEVICE

(75) Inventors: Yuto Suzuki, Osaka (JP); Tomohisa Tajiri, Osaka (JP); Hiroshi Yamashita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 230 days.

(21) Appl. No.: 13/094,980

(22) Filed: Apr. 27, 2011

(65) Prior Publication Data

US 2011/0273903 A1   Nov. 10, 2011

(30) Foreign Application Priority Data

May 6, 2010   (JP) ................. 2010-106465

(51) Int. Cl.
*F21V 7/04*   (2006.01)
*F21V 7/00*   (2006.01)
(52) U.S. Cl.
USPC ....................... 362/606; 362/607; 362/297
(58) Field of Classification Search
USPC ................... 362/606, 607, 257, 291, 297
See application file for complete search history.

(56) References Cited

U.S. PATENT DOCUMENTS

| 4,141,058 A | 2/1979 | Mizohata et al. |
| 2003/0095399 A1 | 5/2003 | Grenda et al. |
| 2006/0181901 A1 * | 8/2006 | Sakai et al. ................ 362/613 |

FOREIGN PATENT DOCUMENTS

| JP | S58-138903 U | 9/1983 |
| JP | 2004-31064 A | 1/2004 |
| JP | 2004-355889 A | 12/2004 |
| JP | 2006-19141 A | 1/2006 |
| JP | 2006-351522 A | 12/2006 |
| JP | 2008-053236 A | 3/2008 |
| WO | WO 2005/067570 A2 | 7/2005 |
| WO | WO 2008/047285 A1 | 4/2008 |

OTHER PUBLICATIONS

European Search Report of corresponding EP Application No. 11 16 4692.3 dated Sep. 8, 2011.

* cited by examiner

*Primary Examiner* — Anh Mai
*Assistant Examiner* — Zachary J Snyder
(74) *Attorney, Agent, or Firm* — Global IP Counselors

(57) ABSTRACT

A planar light-emitting device includes a light source element and a light guide plate. The light source element is configured to emit light. The light guide plate has a housing hole, a light-emitting face and a light reflecting face. The housing hole houses the light source element. The light reflecting face is formed along a side end portion of the light guide plate. The light reflecting face has an inclined portion that is located next to the housing hole in a first direction of the light guide plate and a flat portion that is located next to the inclined portion in a second direction that is perpendicular to the first direction. The inclined portion has an inclination angle with respect to the flat portion such that the light reflected on the inclined portion is prevented from returning the housing hole.

11 Claims, 4 Drawing Sheets

PLANAR LIGHT-EMITTING DEVICE

CROSS-REFERENCE TO RELATED APPLICATIONS

This application claims priority to Japanese Patent Application No. 2010-106465 filed on May 6, 2010. The entire disclosure of Japanese Patent Application No. 2010-106465 is hereby incorporated herein by reference.

BACKGROUND

1. Field of the Invention

The present invention generally relates to a planar light-emitting device. More specifically, the present invention relates to a planar light-emitting device in which a point light-emitting element such as an LED (Light Emitting Diode) is used as a light source element.

2. Background Information

FIG. 5 is a top plan view of a conventional planar light-emitting device. FIG. 6 is a diagram illustrating light emission characteristics of the planar light-emitting device illustrated FIG. 5.

With the conventional planar light-emitting device in FIG. 5, an LED 130 is housed as a point light-emitting element in the center of a circular hole 120 formed in a light guide plate 110. The hole 120 is located near the flat, side end face of the light guide plate 110. The above-mentioned side end face is formed as a reflecting face 111 by applying a reflective sheet, reflective tape, or another such optically reflective film 140 to this side end face. In FIG. 5, 150 is an LED substrate on which the LED 130 is mounted.

With the conventional planar light-emitting device, light that comes out of the LED 130 moves out through the area around the LED 130, passes through the walls of the hole 120, and goes into the light guide plate 110. Light that has entered the light guide plate 110 moves out in all directions around the hole 120 as indicated by the arrows in FIG. 5, and comes out of a light emitting face formed by one face of the light guide plate 110, so that the light guide plate 110 emits planar light. Also, part of the light that has come out of the LED 130, passed through the walls of the hole 120, and entered the light guide plate 110 becomes return light upon being reflected by the reflecting face 111, which is formed by the flat, side end face of the light guide plate 110.

Meanwhile, another conventional backlight is also known (see Japanese Laid-Open Patent Application Publication No. 2006-19141, for example). This backlight is such that a side face emitting type of LED disposed on an LED array substrate is disposed in a recess of a light guide plate. A diffusive and reflective sheet is disposed on the lower face of the light guide plate, a diffusive sheet on the upper face of the light guide plate, and a reflective sheet on the side end face of the light guide plate.

Furthermore, another conventional backlight is also known (see Japanese Laid-Open Patent Application Publication No. 2006-351522, for example). With this backlight, two light guide plates are disposed on both sides of an LED. Reflective sheets are disposed on the lower faces of the light guide plates, and an isolation sheet is disposed on the upper faces of the light guide plates. A peaked reflector is disposed on the isolation sheet. A diffusing sheet is disposed above and a specific distance away from the isolation sheet, and an optical sheet is disposed over this diffusing sheet, forming a hollow portion between the diffusing sheet and the isolation sheet. A semi-cylindrical reflector is provided to the side of the light guide plates, and light that comes out of the side end faces of the light guide plates is guided by the reflector to the hollow portion, reflected by the surface of the peaked reflector, and is emitted through the diffusing sheet and the hollow portion to the outside.

As yet another known example of prior art, there has been research into a backlight device in which light utilization efficiency is improved by disposing a highly reflective member (one with high optical reflectivity) near an LED light source, so that the brightness of the liquid crystal panel is improved (see Japanese Laid-Open Patent Application Publication No. 2004-31064, for example).

SUMMARY

It has been discovered that with the conventional planar light-emitting device described through reference to FIG. 5, light that has become return light upon being reflected by the reflecting face 111 formed by the flat, side end face of the light guide plate 110 (in FIG. 5, the return light is indicated by the arrow labeled A, in particular) goes through the walls of the hole 120 in the light guide plate 110, is incident on and absorbed by the hole 120. Because this happens, it is possible that the return light reflected by the reflecting face 111 will not be efficiently used to achieve planar light-emission at the light emitting face of the light guide plate 110.

The examination results of the emission characteristics of the planar light-emitting device having this constitution are shown in FIG. 6. Specifically, at the rear part of the light guide plate 110 near where the LED 130 is installed, or in other words, at the portion of the light guide plate 110 on the opposite side from the reflecting face 111 with the hole 120 sandwiched in between, light is focused on both sides of a region Z1 at the rear part where the LED 130 is installed, and high brightness regions Z2 appear. But on the other hand, the brightness is far lower than in the high brightness regions Z2 in the above-mentioned region Z1 in between these high brightness regions Z2. Furthermore, the greater the distance from the high brightness regions Z2 in the in-plane direction of the flat reflecting face 111, there less amount of light is emitted and the greater is the difference in the quantity of light in bright/dark regions Z3. Furthermore, it has been discovered that there is a relatively large difference in brightness at the boundaries between the high brightness regions Z2 and the bright/dark regions Z3. Also, it has been discovered that the above-mentioned high brightness regions Z2 are produced by return light that has been reflected by the reflecting face 111 and passed near the hole 120 (examples are indicated by the arrows A1).

It can not be understood from the technology proposed in the above-mentioned Patent Application Publications how the high brightness regions Z2, or the region Z1, the bright/dark regions Z3, and so forth with far lower brightness than the high brightness regions Z2, appear, how a relatively large difference in brightness appears at the boundaries between the high brightness regions Z2 and the bright/dark regions Z3, and so on.

The present invention was conceived in light of the above-mentioned discoveries. One object of the present invention is to provide a planar light-emitting device with which emission characteristics can be improved.

In accordance with one aspect, a planar light-emitting device includes a light source element and a light guide plate. The light source element is configured to emit light. The light guide plate has a housing hole, a light-emitting face and a light reflecting face. The housing hole houses the light source element. The light-emitting face is configured to emit the light from the light source element. The light reflecting face is configured to reflect the light from the light source element. The light reflecting face is formed along a side end portion of the light guide plate. The light reflecting face has an inclined portion that is located next to the housing hole in a first direction of the light guide plate and a flat portion that is located next to the inclined portion in a second direction that is perpendicular to the first direction. The inclined portion has an inclination angle with respect to the flat portion such that the light reflected on the inclined portion is prevented from returning the housing hole.

With the planar light-emitting device, it is possible to provide a planar light-emitting device with which emission characteristics can be improved.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from these disclosures that the following descriptions of the preferred embodiment are provided for illustration only and not for the purpose of limiting the invention as defined by the appended claims and their equivalents.

Figure 1:
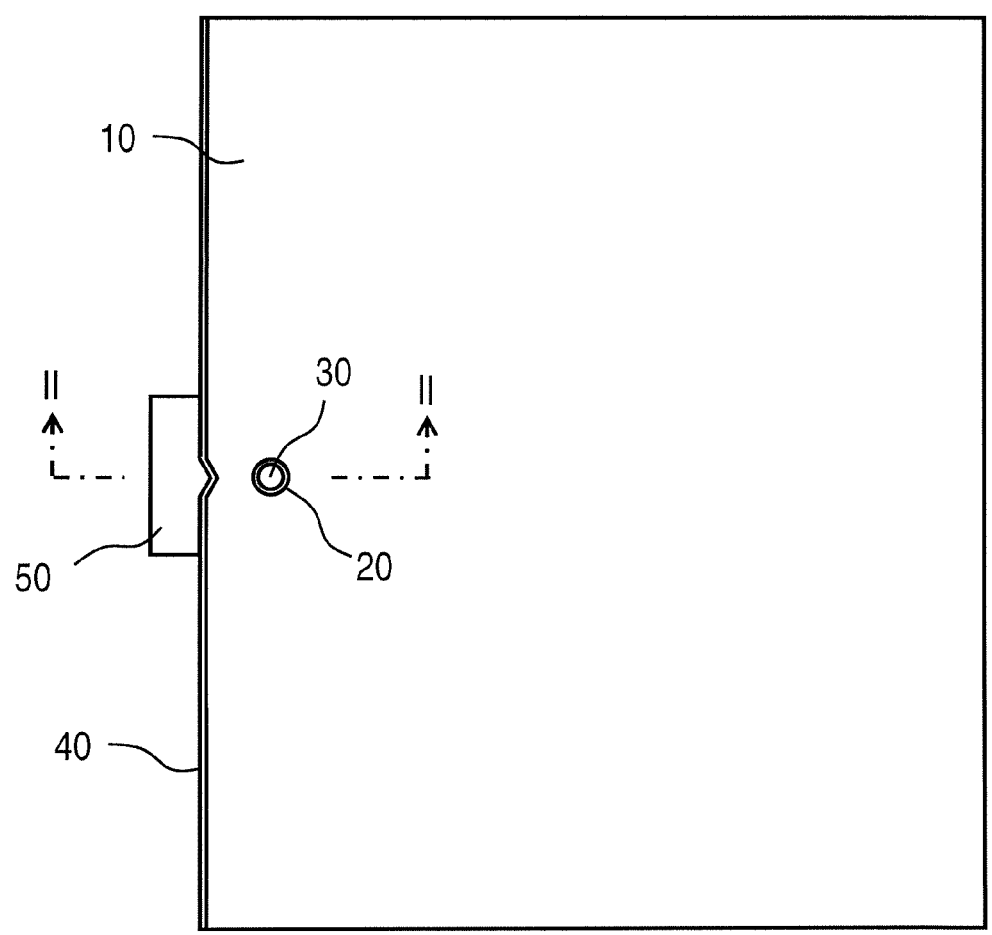
FIG. 1 is a top plan view of a planar light-emitting device in accordance with one embodiment.
Figure 2:
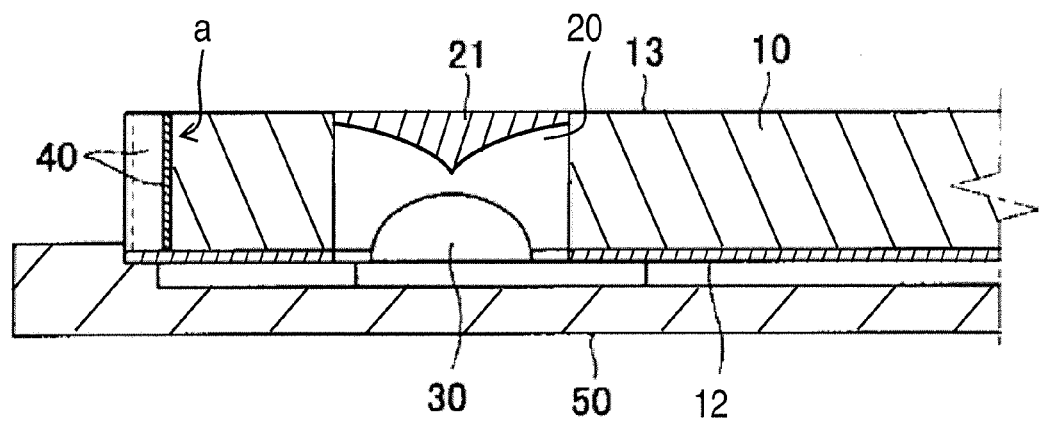
FIG. 2 is a cross sectional view of the planar light-emitting device taken along II-II line in FIG. 1.
Figure 3:
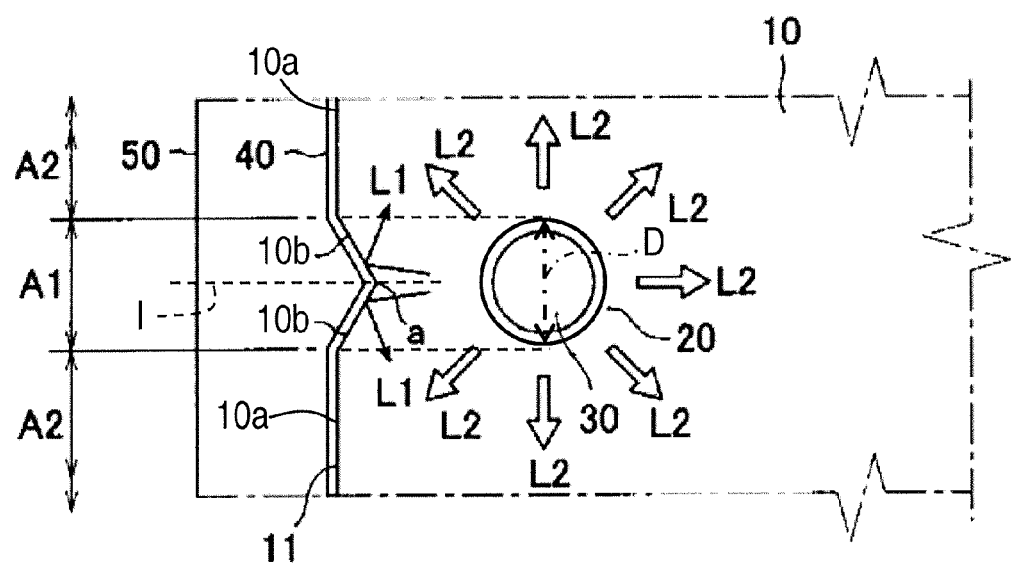
FIG. 3 is a detailed top plan view of the planar light-emitting device illustrated in FIG. 1.

As shown in FIGS. 1-3, a planar light-emitting device in this embodiment includes a light guide plate 10 with a circular housing hole 20, a reflective sheet 12, a reflector 21, an LED (Light-Emitting Diode) (e.g., light source element) 30, an optically reflective film 40 and a substrate 50. The light guide plate 10 is made of a resin, such as an acrylic resin and the like. The light guide plate 10 is integrally formed as a one-piece, unitary member. The planar light-emitting device is used as a backlight for a liquid crystal panel, a liquid crystal module, a liquid crystal display device or the like. The LED 30 serves as a point light-emitting element. The LED 30 is mounted on the substrate 50. The LED 30 is housed in a center portion of the hole 20. The hole 20 is formed in the light guide plate 10. The reflective sheet 12 has a circular cut-out where it overlaps the hole 20. The reflective sheet 12 is provided on a lower face (e.g., bottom face) of the light guide plate 10. The lower face of the light guide plate 10 is formed as a non-emitting face. On the other hand, an upper face of the light guide plate 10 is formed as a light emitting face 13 that allows light to pass through and through which the light emits. Therefore, the non-emitting face is formed by the lower face on the opposite side from the light emitting face 13. The reflective sheet 12 reflects light from the LED 30 toward the light emitting face 13. The LED 30 is installed on the non-emitting face side of the light guide plate 10. The LED 30 is housed in the hole 20. The LED 30 is disposed through the circular cut-out part of the reflective sheet 12.

The light guide plate 10 includes a side end face having a flat side end face 10a and a pair of inclined faces 10b. The hole 20 is located near the side face of the light guide plate 10. The reflector 21 is installed at an upper part inside the hole 20. The reflector 21 reflects light that comes out of the LED 30 toward radial directions of the LED 30. The reflector 21 is separately formed as an independent member of the light guide plate 10. However, the reflector 21 can be integrally formed with the light guide plate 10 as a one-piece, unitary member. The side end face of the light guide plate 10 is formed as a reflecting face 11 by applying a reflective sheet, reflective tape, or another such optically reflective film 40 to this side end face. The LED 30 is mounted on the LED substrate 50.

As shown in FIG. 3, in this embodiment, the reflecting face 11 that is formed by the side end face of the light guide plate 10 is segmented into a hole-facing region (e.g., inclined portion) A1 that includes a portion located nearest the hole 20, and a region that excludes this hole-facing region A1, or in other words, a flat regions (e.g., flat portion) A2 on both sides of the hole-facing region A1. In the hole-facing region A1, the reflecting face 11 changes shape to a recess that is V-shaped (e.g., peaked shape) in top plan view (e.g., when viewed in a third direction). The flat regions A2 on both sides of the hole-facing region A1 remain in the flat shape.

In this embodiment, the width of the hole-facing region A1 in a widthwise direction (e.g., second direction) of the flat side end face 10a along an upper edge of the flat side end face 10a is set to be about the same as the diameter D of the hole 20 in the light guide plate 10. Specifically, the width of the hole-facing region A1 is at least equal to the radius of the hole 20. Preferably, the width of the hole-facing region A1 is at least equal to the diameter D of the hole 20. In the hole-facing region A1, the recessed reflecting face 11 is formed in a peaked shape whose apex is located at the center of the hole-facing region A1 in the widthwise direction. This apex (i.e., widthwise center of the hole-facing region A1) α is located at a location closest to the hole 20 in a lateral direction that perpendicular to the widthwise direction. Two side portions that flank this apex α in the widthwise direction are formed as the inclined faces 10b having a symmetrical, flat surface. As shown in FIG. 3, the hole-facing region A1 is located next to the hole 20 in the lateral direction. The flat regions A2 are located next to the hole-facing region A1 in the widthwise direction. The inclined faces 10b are symmetrically formed each other with respect to an imaginary plane I of symmetry that is perpendicular to the widthwise direction.

With the planar light-emitting device, the light emitted by the LED 30 move out in the radial directions around the LED 30, pass through an inner wall of the hole 20, and go into the light guide plate 10. The light that enters the light guide plate 10 moves out in all directions around the hole 20 as indicated by the arrows L2 in FIG. 3, and comes out of the light emitting face 13 formed by the upper face of the light guide plate 10. As a result, the light guide plate 10 emits planar light. Also, part of the light that comes out of the LED 30, passes through the inner wall of the hole 20, and enters the light guide plate 10 becomes return light upon being reflected by the entire reflecting face 11, which is formed by the side end face of the light guide plate 10.

Of this return light, the light reflected by the reflecting face 11 formed by the inclined faces 10b moves in a direction corresponding to the inclination angles of the inclined faces 10b (the inclination angles of the inclined faces 10b with respect to the flat side end face 10a of the reflecting face 11 of the flat region A2). In this embodiment, the inclination angles of the inclined faces 10b is set so that the return light reflected by the reflecting face 11 formed by the inclined faces 10b included in the hole-facing region A1 moves in a direction that does not return into the hole 20, as indicated by the arrows L1 in FIG. 3. In other words, the inclination angles of the inclined faces 10b is set such that the light that directory incidents from the LED 30 and reflects on the inclined faces 10b is prevented from returning or entering the hole. Accordingly, either the amount of return light L1 reflected by the reflecting face 11 formed by the inclined faces 10b that goes into the hole 20 is reduced, or the return light L1 does not go into the hole 20 at all. Rather the return light reflected by the inclined faces 10b moves to the sides of the hole 20 and emits from the light emitting face 13. Thus, this return light L1 is utilized more effectively for planar light emission.

Figure 4:
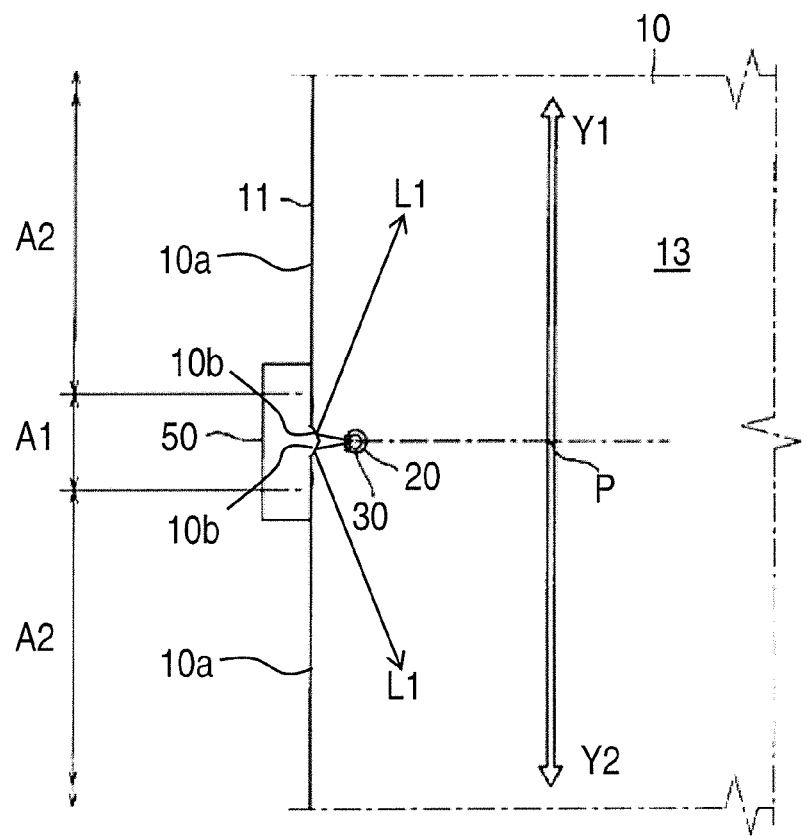
FIG. 4 is a top plan view of the planar light-emitting device illustrating emission characteristics of the planar light-emitting device illustrated in FIG. 1.
Figure 5:
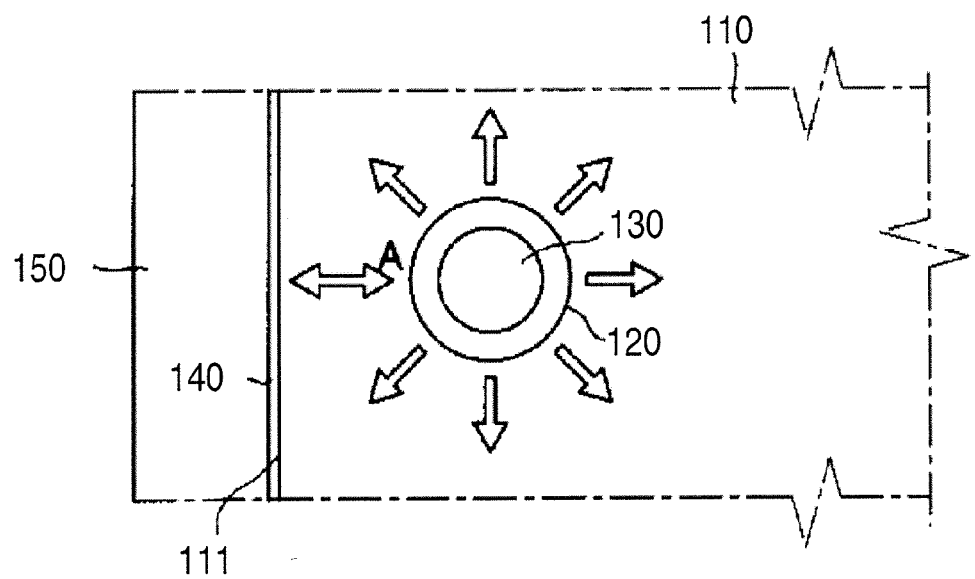
FIG. 5 is a detailed top plan view of a conventional planar light-emitting device.

The emission characteristics of the planar light-emitting device pertaining to this embodiment are examined. The results are schematically shown in FIG. 4. Specifically, the return light reflected by the hole-facing region A1 and the flat regions A2 of the reflecting face 11 is less likely to go into the hole 20 and be absorbed. In particular, the return light L1 reflected by the reflecting face 11 included in the hole-facing region A1 and formed by the inclined faces 10b splits up and moves to the two sides flanking the hole 20. Thus, this return light L1 mixes with the return light reflected by the reflecting face 11 included in the flat regions A2, making it harder to distinguish the region Z1, the high brightness regions Z2, and the bright/dark regions Z3 described through reference to FIG. 6. More specifically, with the light emitting face 13 of the light guide plate 10 shown in FIG. 4, the greatest amount of light is at a back portion P of the hole 20 that extends in the lateral direction from the hole 20. Then, this portion P becomes the brightest region in the light emitting face 13. Furthermore, brightness decreases as moving away from this portion P in the widthwise directions of the arrows Y1 and Y2 toward the sides of the hole 20. However, there is not that much difference in the quantity of light between the bright and dark portions (i.e., between the portion P and the portions spaced apart from the portion P in the lateral directions).

Figure 6:
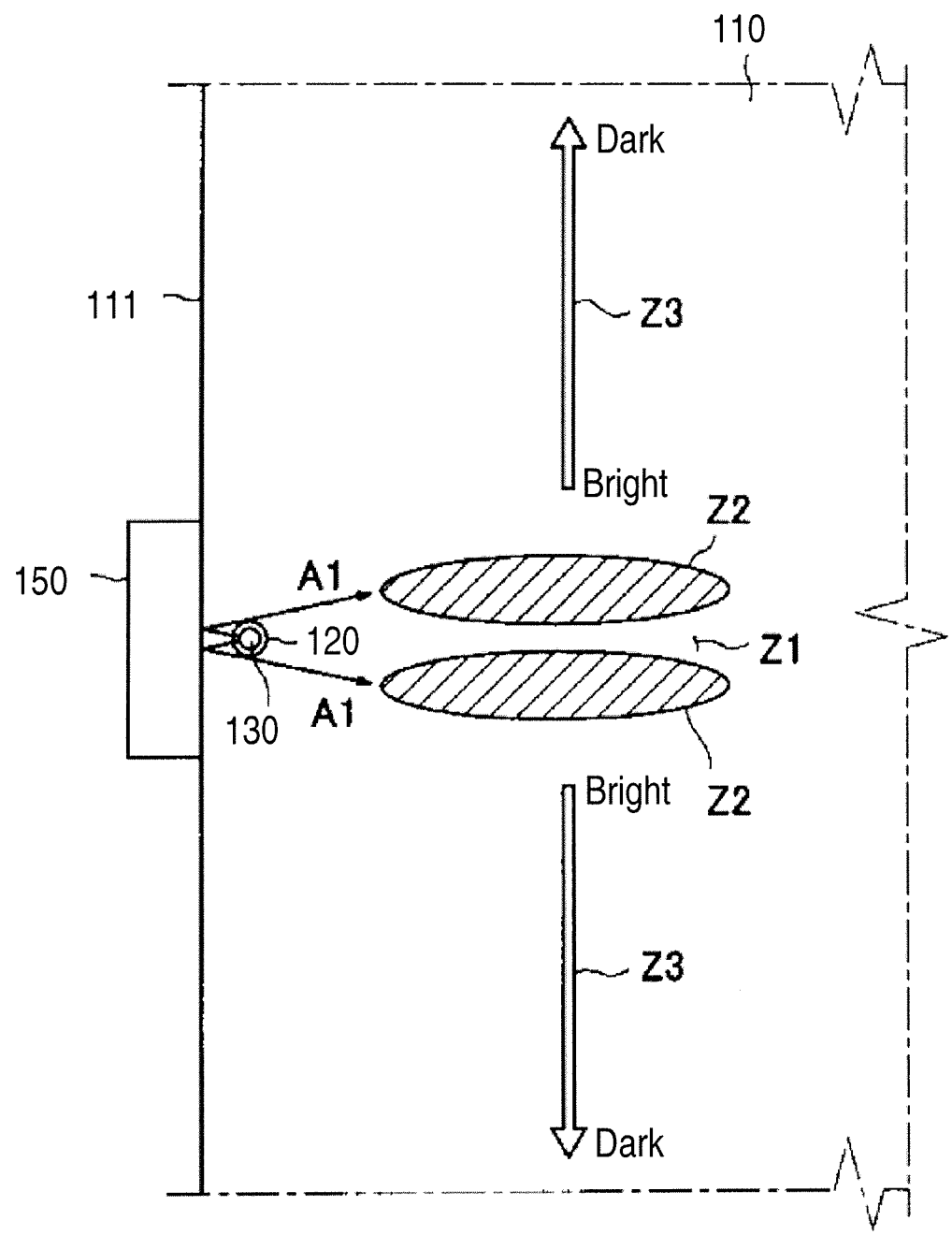
FIG. 6 is a top plan view of the conventional light-emitting device illustrating in FIG. 5.

This will now be described through contrast with the emission characteristics shown in FIG. 6. Regarding the difference in the quantity of light (bright/dark) of the light emitting face within given regions behind the holes 20, 120, with the emission characteristics shown in FIG. 6, there is a large difference in brightness between the region Z1 and the two high brightness regions Z2. Furthermore, even among the bright/dark regions Z3, there is a large difference in brightness between the bright and dark portions. Moreover, there is a large difference in brightness at the boundaries between the high brightness regions Z2 and the bright/dark regions Z3. On the other hand, with the emission characteristics shown in FIG. 4, the difference in brightness within the corresponding regions of the light emitting face 13 corresponding to the regions Z1 to Z3 shown in FIG. 6, respectively, is reduced. Specifically, the region Z1 with far lower brightness and the high brightness regions Z2 with far higher brightness are less likely to appear, and there will be less of a difference in brightness at the boundaries between the high brightness regions Z2 and the bright/dark regions Z3. Furthermore, there will be less of a difference in the amounts of light between the bright and dark portions of the bright/dark regions Z3. Therefore, there is less discrepancy in the quantity of light over the entire light emitting face 13 of the light guide plate 10, and the light is emitted in a uniform brightness. Thus, the emission characteristics are improved over those of a conventional planar light-emitting device.

With this embodiment, the reflecting face 11 included in the hole-facing region A1 has a peaked shape, and the inclined faces 10b are formed as flat faces. However, the reflecting face 11 can have some other shape. For example, it is also possible for the inclined faces 10b to be formed as curved faces, respectively. In other words, the shape of these parts should be decided such that the amount of return light that is reflected by the reflecting face 11 included in the hole-facing region A1 and that goes into the hole 20 is reduced relative to a case in which the hole-facing region A1 has a flat side face as a conventional planar light-emitting device.

With the planar light-emitting device pertaining to this embodiment, the reflecting face 11 formed by the side end face of the light guide plate 10 is segmented into the hole-facing region A1 that includes the portion located the shortest distance from the hole 20 that houses the LED (e.g., point light-emitting element) 30, and the flat regions A2 on both sides thereof. The reflecting face 11 in the hole-facing region A1 is formed in a peaked shape, for example. Thus, the return light reflected by the reflecting face 11 efficiently reaches the bright/dark regions Z3 shown in FIG. 6. Accordingly, not only is there less of a difference in the quantity of light between the bright and dark portions of the bright/dark regions Z3 shown in FIG. 6, but there is a reduction in the quantity of light in the high brightness regions Z2 shown in FIG. 6. As a result, there is less of a difference between the quantity of light in the region Z1 and the quantity of light in the regions Z2. Furthermore, there is less of a difference in the brightness at the boundaries between the high brightness regions Z2 and the bright/dark regions Z3 shown in FIG. 6. Therefore, there is less of a difference in the quantity of light over the entire light emitting face 13 of the light guide plate 10. Thus, the emitted light is of more uniform brightness, and the emission characteristics of the planar light-emitting device are improved.

Also, this effect is achieved merely by changing the shape of part of the side end face that forms the reflecting face 11 of the light guide plate 10, so an advantage is that there is no need to add any special parts.

With the planar light-emitting device, the device merely includes the LED 30 at one location as a light source. However, the device can include a plurality of LEDs 30 as a light source. In this case, the light guide plate 10 have a plurality of pairs of inclined faces 10b on the side end face of the light guide plate 10 at spaced apart locations along the side end face, and a plurality of holes 20 at locations corresponding to the pairs of the inclined faces 10b. Then, the LEDs 30 are housed in the holes 20, respectively.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional teems "forward, rearward, above, downward, vertical, horizontal, below and transverse" as well as any other similar directional terms refer to those directions of a planar light-emitting device equipped with the present invention. Accordingly, these terms, as utilized to describe the present invention should be interpreted relative to a planar light-emitting device equipped with the present invention as used in the normal operating position.

While a preferred embodiment have been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A planar light-emitting device comprising:
    a light source element configured to emit light;
    a light guide plate having
        a housing hole that houses the light source element,
        an upper face defining a light-emitting face that is configured to emit the light from the light source element, and
        a side end face arranged relative to the upper face, the side end face having an inclined portion that is located next to the housing hole in a first direction of the light guide plate and a flat portion that is located next to the inclined portion in a second direction that is perpendicular to the first direction, the inclined portion having an inclination angle with respect to the flat portion such that the light reflected at the inclined portion is prevented from returning the housing hole; and
    a reflective film disposed on the inclined portion and the flat portion of the side end face of the light guide plate, an interface between the side end face and the reflective film defining a light reflecting face that is configured to reflect the light from the light source element.

2. The planar light-emitting device according to claim 1, wherein
    the housing hole of the light guide plate has a circular shape.

3. The planar light-emitting device according to claim 1, wherein
    the inclined portion of the side end face of the light guide plate has a peaked shape with an apex portion as viewed from a third direction that is perpendicular to the first and second directions of the light guide plate, the apex portion being located closest to the housing hole in the inclined portion, the apex portion being further located at a center of the inclined portion along the second direction of the light guide plate.

4. The planar light-emitting device according to claim 3, wherein
    the inclined portion of the side end face of the light guide plate includes a pair of inclined faces that is inclined with respect to the flat portion of the side end face of the light guide plate, the inclined faces sandwiching the apex portion in the second direction of the light guide plate, the inclined faces being symmetrically formed each other with respect to an imaginary plane of symmetry that is perpendicular to the second direction of the light guide plate.

5. The planar light-emitting device according to claim 1, wherein
    the inclined portion of the side end face of the light guide plate has a width in the second direction of the light guide plate that is at least equal to a diameter of the housing hole.

6. The planar light-emitting device according to claim 1, further comprising
    a reflective sheet configured to reflect the light from the light source element toward the light-emitting face, the reflective sheet being disposed on a bottom face of the light guide plate, the bottom face of the light guide plate being opposite the light-emitting face in a third direction that is perpendicular to the first and second directions of the light guide plate.

7. The planar light-emitting device according to claim 1, further comprising
    a reflector disposed inside the housing hole of the light guide plate, the reflector being configured to reflect the light from the light source element in a radial direction of the housing hole.

8. The planar light-emitting device according to claim 7, wherein
    the reflector is independently formed as a separate member from the light guide plate.

9. The planar light-emitting device according to claim 7, wherein
    the reflector is disposed on an upper side of the light source element relative to the light source element in an axial direction of the housing hole of the light guide plate.

10. The planar light-emitting device according to claim 4, wherein
    the inclined faces of the inclined portion of the side end face of the light guide plate include flat surfaces, respectively, the flat surfaces being symmetrically formed each other with respect to the imaginary plane of symmetry.

11. The planar light-emitting device according to claim 1, wherein
    the light source element includes only a single light-emitting diode that is housed inside the housing hole of the light guide plate located at a single location of the light guide plate.

* * * * *